United States Patent Office 3,545,958
Patented Dec. 8, 1970

3,545,958
PROCESS OF RECOVERING IRON ORE FROM IRON PYRITES WITH ACID LEACHANT
Angel V. Ortuno, Vicente Martin Municio, and Federico Lopez Mateos, Madrid, Spain, assignors to Empresa Auxiliar de la Industria S.A., Madrid, Spain
No Drawing. Filed Sept. 27, 1968, Ser. No. 763,366
Claims priority, application Spain, Sept. 30, 1967, 345,622
Int. Cl. C21b 21/04; C22b 1/12, 3/00
U.S. Cl. 75—3                     14 Claims

ABSTRACT OF THE DISCLOSURE

Iron ore suitable for reduction in the blast furnace is obtained from iron pyrites by subjecting the pyrites to roasting and then subjecting the cinders from the roasting to lixiviation with the aid of an acid leaching liquor to eliminate non-ferrous components, recovering at least part of the leaching liquor and subjecting the ore obtained from the lixiviation to pelletizing in the presence of a moistening agent and using at least part of the recovered leaching liquor to form the said moistening agent, additionally subjecting another part of the leaching liquor to a precipitation treatment to obtain iron oxides and hydroxides and pelletizing the thus obtained iron compounds to obtain a substantially uniform size purple ore product.

BACKGROUND OF THE INVENTION

The cinders resulting from the roasting of iron pyrites usually comprise a matrix of iron oxides which normally and in different proportions contains compounds such as oxides, sulphates or ferrites of metals like copper, zinc and lead as well as arsenates of iron. These admixtures are present usually in amounts sufficient to destroy the usefulness of the cinders for direct production therefrom of iron ores.

In order to prepare the cinders for the furnace processes employed in iron and steel making, the cinders are therefore first submitted to a lixiviation treatment so as to obtain an ore identified as "purple ore" which can then be fed into the blast furnace. This purple ore is therefore the raw material for the recovery of the iron metal and must have the necessary physical and chemical properties.

The lixiviation operation until quite recently used to be practiced on an industrial scale by employing a dilute sulphuric leaching liquor as extracting agent. The leaching liquor dissolved the impurities in the cinders but the extraction of the non-ferrous metals, such as lead and arsenic, from the cinders presented difficulties depending on the individual composition of the cinders and the roasting conditions.

To overcome these difficulties, two approaches are possible: One is an increase in the concentration of the conventional sulphuric leaching liquor, the other the use of more active leaching liquors, such as hydrochloric acid, nitric acid or chloronitric acid (Spanish Pat. No. 287,294).

In either case, by higher concentration of acid or by using more powerful acids, it is possible to obtain a desired product sufficiently free of impurities. However, with either process, the amount of iron dissolved in the leaching liquor in the form of bivalent or trivalent ions is substantially increased. It was for this reason that these processes did not find practical application. The loss in the recovery of the iron from the original ore is too high.

Another problem results from the necessity that, for use in the blast furnace, an iron ore must be obtained with a size proportion that should avoid mechanical complications during the furnace operation. The product obtained from the roasting of the pyrites and subsequent lixiviation of the cinders unfortunately has a rather broad range of different sizes and in particular includes a high percentage of small diameter particles. It is for this reason customary to agglomerate the purple ore in the form of pellets with a diameter larger than 5 mm. The pellets then are suited, from the physical and chemical point of view, for reduction in the blast furnace to form a good grade of pig iron.

The agglomeration process itself is conventionally carried out in two steps. In the first step the green pellets are produced on a pan-type of dish-type pelletizer while adding a moistening agent, usually water, to the mixture of purple ore and certain agglomerating agents, such as bentonite or infusorial earth, until a round pellet of sufficient consistency is obtained that is fit to be shipped to the kiln. This pelletizing step is then followed by a second step wherein the green pellets are hardened and burnt at temperatures of approximately 1300° C. in order to make the pellets more resistant to compression and abrasion without causing them to lose their porosity which latter is important for the reducing process.

SUMMARY OF THE INVENTION

It is an object of the invention to permit the use of leaching liquors in the above lixiviation process of greater capacity and in particular to permit the use of sulphuric acid of higher concentration or to permit the use of different acids, such as, hydrochloric or nitric acid.

It is a more specific object of the invention to avoid or minimize the losses caused by the dissolving of the iron or iron compounds in the leaching liquors.

These objects are accomplished by the invention in the following manner:

A purple iron ore suited for reduction in the blast furnace is obtained from iron pyrites by subjecting the pyrites to roasting and then subjecting the cinders from the roasting to lixiviation with the aid of an acid leaching liquor to eliminate non-ferrous components, recovering at least part of the leaching liquor and subjecting the ore obtained from the lixiviation to pelletizing in the presence of a moistening agent and using at least part of the recovered leaching liquor to form the said moistening agent. The invention also involves the concept of subjecting another part of the leaching liquor to a precipitation treatment to obtain iron oxides and hydroxides and then pelletizing the thus obtained iron compounds to obtain a substantially uniform size purple ore product. The pelletizing may again be effected with another part of the leaching liquor serving as moistening agent.

DESCRIPTION OF THE PREFERRED EMBODIMENTS

As has been stated above, the invention has a double aspect: First, the leaching liquors are employed as the moistening agent of the purple ore in order to form the green pellets in the pelletizing operation.

Second, the dissolved iron and iron compounds are extracted from the leaching liquors by a precipitation and simultaneous oxidation so as to obtain iron oxides ($Fe_2O_3$), oxyhydroxide of iron (FeOOH) and hydroxide of iron, $Fe(OH)_3$. The thus extracted product is then suited for the pellet production and may be used also together with the use of the leaching liquor as moistening agent in the production of pellets.

It is thus possible, by way of the invention, both to use more powerful leaching liquors and to avoid loss of iron because of the powerful nature of the liquors which cause substantial amounts of iron to dissolve in the leaching liquor. Up to the present invention, the iron containing solutions have generally been considered as waste material.

More specifically, the process of the invention is as follows:

One portion of the leaching liquors from which the non-ferrous materials have previously been extracted for separate use, is set aside for use as moistening agent for making the green pellets from the cinder material obtained in the roasting of the pyrites.

Another portion of the leaching liquor, or if desired all of it, is subjected to simultaneous precipitation and oxidation whereby an insoluble precipitate is obtained from the iron ions in the solution. This process by itself is of a conventional nature. It is sufficient to say that it involves a precipitation occurring together with oxidation resulting in the formation of iron oxides and hydroxides such as mentioned above.

Precepitation and oxidation may proceed successively in any desired sequence or simultaneously. The insoluble oxide and hydroxide can then be used for the pelletizing by adding them to the purple ore obtained directly from the lixiviation operation.

The pelletizing itself is again carried out in conventional manner, for instance, by subjecting the mixture of purple ore and precipitate to a kneading operation. A broad range of proportions may be used of precipitate and leaching liquor and in addition separate agglomerating agents may be added. The relative proportions between solids and liquors will depend on the viscosity of the mixture and also on the concentration of ions in the moistening liquor.

In general the amount of agglomerating agent added may vary between 0 and 5% by weight of the solid product.

On the dish or pan-type pelletizer there is thus produced a homogeneous mixture usually identified as "green pellets." These green pellets are subsequently passed to a kiln where they are burned at a high temperature, preferably not exceeding 1300° C. The pellets are thus reinforced and volatile components are eliminated, such as arsenic and antimony, which latter are impurities in the production of the final iron metal.

The following examples will further illustrate the invention.

EXAMPLE 1

A purple ore was obtained by subjecting iron pyrites resulting in the form of cinders from the previous roasting of the pyrites to lixiviation with a leaching liquor containing nitric acid, hydrochloric acid, sodium chloride and water in the relative proportions of 2, 8 and 6.5%. The ratio of leaching liquor to cinder was 2. In the leaching operation a product was obtained comprising 822 kg., the composite product having the composition as follows:

|  | Percent |
|---|---|
| Iron | 63.94 |
| Non-ferrous metals | 0.25 |
| Sulphur | 0.40 |
| Arsenic | 0.10 |
| Insoluble matter | 6.08 |

After extracting the non-ferrous metals, the leaching liquors contain 48.3 grams of iron per litre.

The product was then subjected to pelletizing using the purple ore obtained from the lixiviation operation and employing a portion of the leaching liquors as moistening agent together with bentonite as agglomeration agent. 0.3 litre of leaching liquor were used for each kilogram of solids. 847 kg. of pellets were obtained, after firing, from the iron ores. These pellets contained 63.3% of iron as appears more specifically from the following figures.

| Cinders | $822 \cdot 0.6394 =$ | 525.59 kg. of iron. |
|---|---|---|
| Leaching liquor | $822 \cdot 0.3 \cdot 0.0483 =$ | 11.91 kg. of iron. |
| Total iron in the pellets | | 537.50 kg. |
| Concentration of iron in the pellets. | $537.5/847 \cdot 100 =$ | 63.3 |

EXAMPLE 2

Leaching liquors as employed in the lixiviation of 1000 kg. of pyrite cinders in Example 1 were subjected to a simultaneous reaction of precipitation and oxidation with oxygen and ammonia, resulting in a solid mixture of oxides and hydroxides of iron which after calcination yielded iron oxide in the form $Fe_2O_3$ in an amount of 108 kg. as illustrated further by the following figures:

The quantity of the leaching liquors obtained in the lixiviation of the 1000 kg. of the cinders was 1560 litres, containing:

$$1560 \cdot 0.0483 = 75.4 \text{ kg. of iron}$$

which was oxyprecipitated in order to form a mixture of oxides and hydroxides of iron, which after calcination yielded:

$$75.4 \, \frac{160}{111.7} = 108 \text{ kg. of iron oxides } (Fe_2O_3)$$

The product thus obtained was then subjected to pelletizing using water as the moistening agent. In this manner 924 kg. of pellets were obtained with a content of 65.0% of iron.

EXAMPLE 3

The lixiviation operation was carried out as described in Example 1 using however a leaching liquor consisting of a sulphuric acid of 10% concentration. The ratio of leaching liquor to cinders was the same. A purple iron ore was obtained in this case of the following composition:

|  | Percent |
|---|---|
| Iron | 64.15 |
| Non-ferrous metals | 0.38 |
| Sulphur | 0.40 |
| Arsenic | 0.13 |
| Insoluble matter | 6.08 |

After extraction of the non-ferrous metals for other use, the iron concentration of the leaching liquor was 12 grams per litre. The purple ore obtained was again subjected to pelletizing employing bentonite as the agglomerating agent as in Example 1. However the sulphuric leaching liquors before being used as moistening agent were submitted to an evaporation step to increase their concentration of iron.

The thus obtained green pellets were then burnt at a temperature of about 1250° C. resulting in the substantially complete elimination of sulphur and arsenic and at the same time producing a pellet of high porosity. The iron concentration in the pellet was 63.4%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An improvement in the process of recovering an iron ore from iron pyrites by roasting the pyrites and subjecting the cinders to lixiviation with the aid of an acid leaching liquor to eliminate non-ferrous components, the said improvement comprising recovering at least part of the leaching liquor and subjecting the ore obtained from the lixiviation to pelletizing in the presence of a moistening agent consisting of the said recovered leaching liquor.

2. The process of claim 1 wherein the acid in the leaching liquor is sulphuric acid of a concentration in excess of 5%.

3. The process of claim 1 wherein the leaching liquor is selected from the group consisting of hydrochloric acid, nitric acid and chloronitric acid.

4. The process of claim 1 wherein the leaching liquor comprises nitric acid, hydrochloric acid and sodium chloride in proportion of 2, 8 and 6.5%, respectively, of the total liquor and wherein the ratio of leaching liquor to cinders is about 2.

5. The process of claim 1 wherein part of the leaching liquor is subjected to precipitation of the iron ions present in the leaching liquor to obtain a product essentially consisting of iron oxides and iron hydroxides and subjecting the said product to said pelletizing step by using another part of the leaching liquors as moistening agent in said pelletizing step.

6. The process of claim 5 wherein the pelletizing operation is applied to said ore obtained from the precipitation of the leaching liquors together with ore obtained directly from said lixiviation operation.

7. The process of claim 1 wherein an agglomerating agent is added in said pelletizing step in addition to said moistening agent.

8. The process of claim 1 wherein the agglomerating agent is used in an amount of up to 5% by weight of the solid product.

9. The process of claim 7 wherein the agglomerating agent is bentonite or infusorial earth.

10. The process of claim 1 wherein the pellets are subsequently subjected to firing at a temperature up to 1300° C. to eliminate the volatile components.

11. An improvement in the process of recovering an iron ore from iron pyrites by roasting the pyrites and subjecting the cinders to lixiviation with the aid of an acid leaching liquor to eliminate non-ferrous components, the said improvement comprising recovering at least part of the leaching liquor, precipitating the iron ions present in the leaching liquor to obtain an iron product consisting essentially of iron oxides and iron hydroxides and subjecting the said iron product to pelletizing.

12. The process of claim 11 wherein water is used as the moistening agent in said pelletizing step.

13. The process of claim 11 wherein sulphuric acid is used as the leaching liquor in a concentration of about 5%.

14. The process of claim 11 wherein the leaching liquor is selected from the group consisting of hydrochloric acid, nitric acid and chloronitric acid and a mixture of these acids.

References Cited

UNITED STATES PATENTS

| | | | |
|---|---|---|---|
| 757,531 | 4/1904 | Wedge | 75—3 |
| 780,464 | 1/1905 | Wedge | 75—3 |
| 804,691 | 11/1905 | Wedge | 75—3 |
| 2,711,951 | 6/1955 | West et al. | 75—3 |
| 3,088,820 | 5/1963 | Mackin et al. | 75—7 |
| 3,232,744 | 2/1966 | Munekata et al. | 75—101X |
| 3,402,041 | 9/1968 | Feld et al. | 75—101X |

FOREIGN PATENTS

| | | | |
|---|---|---|---|
| 14,399 | 1908 | Great Britain | 75—3 |

ALLEN B. CURTIS, Primary Examiner

U.S. Cl. X.R.

75—7, 101